United States Patent [19]
Heller et al.

[11] 3,733,501
[45] May 15, 1973

[54] SEALING MEANS FOR LIQUID COOLED ROTORS FOR DYNAMOELECTRIC MACHINES

[75] Inventors: Paul R. Heller, Murrysville, Pa.; Ram T. Gehani, Bombay, India

[73] Assignee: Westinghouse Electric Corporation, Pittsburgh, Pa.

[22] Filed: Sept. 17, 1971

[21] Appl. No.: 181,479

[52] U.S. Cl. .................................... 310/54, 310/66
[51] Int. Cl. ........................................... H02k 9/00
[58] Field of Search .................... 310/54, 66, 58, 56, 310/59, 61, 64, 65

[56] References Cited

UNITED STATES PATENTS

| | | | |
|---|---|---|---|
| 3,535,565 | 10/1970 | Lang | 310/58 |
| 3,476,961 | 11/1969 | Heard | 310/58 |
| 3,626,717 | 12/1971 | Lorch | 310/54 |
| 3,353,043 | 11/1967 | Albright | 310/61 |
| 3,393,333 | 7/1968 | Kudlacik | 310/61 |
| 3,145,314 | 8/1964 | Becker | 310/61 |
| 3,457,440 | 7/1969 | Horsley | 310/52 |

*Primary Examiner*—R. Skudy
*Attorney*—A. T. Stratton and F. P. Lyle

[57] ABSTRACT

Gland seals are provided for the entrance and discharge passages of liquid cooled rotors for dynamoelectric machines. Coolant liquid is introduced or discharged through stationary coolant chambers surrounding the rotor and enclosing the entrance and discharge passages. Gland seal rings encircle the rotor adjacent the coolant chambers and sealing liquid is introduced into the clearance between each seal ring and the rotor at a pressure not exceeding the pressure of the coolant liquid to minimize leakage of the coolant liquid while preventing contamination of the coolant liquid by the sealing liquid.

12 Claims, 3 Drawing Figures

SEALING MEANS FOR LIQUID COOLED ROTORS FOR DYNAMOELECTRIC MACHINES

BACKGROUND OF THE INVENTION

The present invention relates to liquid cooled rotors for dynamoelectric machines of large size, such as turbine generators, and more particularly to sealing means for the passages or openings through which coolant liquid is introduced into and discharged from the rotor.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size. The coolant used in these machines has usually been hydrogen, which fills the gas-tight housing and is circulated by a blower on the rotor shaft through the ducts of the stator and rotor windings and through ducts in the stator core.

The maximum ratings required in large generators have continued to increase, however, making it necessary to further improve the cooling of these machines in the largest sizes. A substantial improvement in cooling can be obtained by the use of more efficient coolant fluids such as liquids. This has been done in stators by circulating a liquid coolant such as water through the ducts of the stator winding, and a considerable improvement in cooling has thus been obtained. A substantial further improvement can be obtained by applying liquid cooling to the rotor by circulation of a suitable liquid such as water through passages in the rotor windings.

Many problems are involved, however, in circulating a liquid coolant through passages in the rotor of a large generator rotating at high speed, usually 3,600 rpm. One of the most difficult problems is that of introducing the liquid into the rotor and discharging it therefrom. The liquid is preferably introduced along the axis of the shaft, where the centrifugal force on the liquid is at a minimum, and is discharged through radial passages in the rotor shaft. A relatively large volume of liquid must be introduced into the rotor under sufficient pressure to maintain the desired flow rate through the rotor, and the same liquid is discharged from the rotor at high velocity and under high pressure into a stationary discharge chamber from which it is drained. Suitable seals must be provided at both the entrance and discharge openings or passages, but the provision of such seals presents a difficult problem because of the high velocities and pressures involved. The necessity of effective seals for this type of rotor cooling has been recognized in the prior art, as in the patents to Fechheimer U.S. Pat. No. 2,527,878 and Heard et al. U.S. Pat. No. 3,398,304, for example, but no satisfactory seal has actually been available heretofore.

The known types of seals for rotating shafts all have serious disadvantages for the present purpose. Labyrinth seals are well known but such seals are not effective for such coolant liquids as water because of the large clearances required and the low viscosity of water, which result in excessive leakage through the seal. Friction or face type seals are also well known. These seals, however, are impractical for large, liquid cooled turbine generator rotors because of the very high rubbing velocities which may, for example, be in excess of 20,000 feet per minute. Such velocities result in very rapid wear with excessive heating and friction loss. Fluid film gland seals using stationary seal rings are more suitable for the difficult conditions of service under consideration. The known single flow type of circumferential ring seal, however, would have excessive leakage of liquid through the annular clearance because of the high pressure drop across the ring. The coolant must be treated to decontaminate the water and to remove excess oxygen to minimize possible corrosion. The leakage and subsequent loss of large amounts of this treated water is undesirable as it would mean that a large amount of treated makeup water would have to be provided, requiring an increased amount of expensive treating equipment and increased cost of treatment. Leakage of the treated coolant must therefore be minimized.

SUMMARY OF THE INVENTION

In accordance with the present invention, a liquid cooled rotor for large turbine generators is provided with very effective sealing means at both the entrance and discharge passages for preventing escape of the coolant liquid. The seals are of the radial gland seal type utilizing a stationary sealing ring encircling the shaft adjacent a stationary coolant chamber which contains the coolant liquid entering or discharged from the shaft. The seal ring encircles the shaft with a small clearance and in order to minimize leakage of the coolant liquid through the clearance, a secondary or sealing liquid is introduced into the clearance between the ring and the shaft and is maintained at a pressure not exceeding the pressure in the coolant chamber. A small amount of the coolant liquid may therefore escape through the clearance around the shaft, but the amount of liquid escaping is minimized and any contamination of the coolant liquid by the sealing liquid is prevented. The sealing liquid, together with a small amount of coolant liquid, escapes into a chamber adjacent the seal ring which is maintained at atmospheric pressure and is drained therefrom. This chamber is sealed to prevent the escape of liquid along the shaft, and an adjacent chamber containing air at a pressure above atmospheric is provided to prevent liquid from escaping from the atmospheric chamber. In this way, a very effective seal is provided even for large volumes of liquid at high velocities and pressures.

BRIEF DESCRIPTION OF THE DRAWINGS

The invention will be more fully understood from the following detailed description of an illustrative embodiment, taken in connection with the accompanying drawings, in which.

DESCRIPTION OF THE PREFERRED EMBODIMENT

Figure 1:
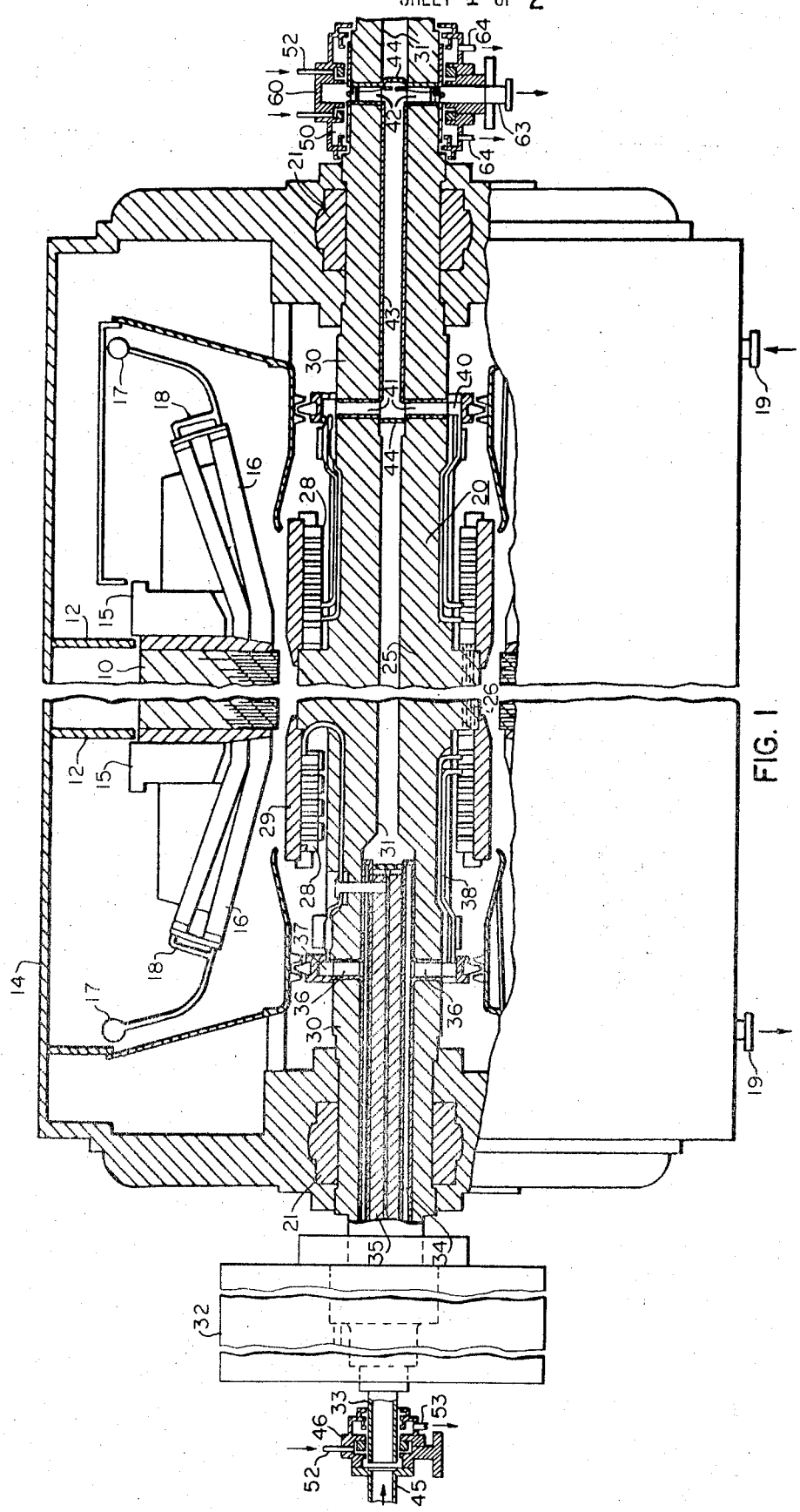
FIG. 1 is a view in longitudinal section and partly in elevation of a turbine generator having a liquid cooled rotor with sealing means embodying the present invention.

Referring first to FIG. 1 of the drawings, the invention is shown embodied in a large turbine generator of typical construction, although it will be understood that the sealing means of the present invention may be used in machines of any desired type.

As shown, the generator has a stator core 10 supported by frame rings 12 in a substantially gas-tight outer housing 14. The stator core 10 is of the usual laminated construction having a generally cylindrical bore therethrough, and the laminations are clamped between suitable end plates 15 in the usual manner. The stator core 10 has longitudinal slots in its inner periphery for the reception of a stator winding 16 which may be of any suitable type but which is shown as a liquid cooled winding. For this purpose circular inlet and discharge manifolds 17 are provided at opposite ends of the machine and connected through suitable means, generally indicated at 18, to circulate a coolant liquid such as water through the coils of the stator winding 16. The manifolds 17 may be connected as indicated diagrammatically at 19 to an external recirculating system of any desired type. The housing 14 is filled with a coolant gas, preferably hydrogen, which is circulated through the interior of the housing to cool the stator core, and suitable baffling of any desired type may be provided in the housing to direct the flow of gas therein.

The machine has a rotor member 20 which is disposed in the bore of the stator core 10 and supported in bearings 21 in the ends of the housing 14. The bearing assemblies preferably include gland seals to prevent leakage of gas along the rotor shaft and may be of any suitable or usual construction but have not been illustrated in detail as they are not a part of the invention. The rotor member 20 has a central body portion 25 which is provided with the usual peripheral slots for the reception of a rotor winding 26. The winding 26, which constitutes the field winding of the generator, may be arranged in any suitable manner in the slots of the rotor to form the desired number of magnetic poles, usually either two or four in machines of this type. The winding 26 is constituted of copper conductors which extend longitudinally through the slots of the rotor body 25 and generally circumferentially in the end turn portions 28, which lie beyond the ends of the body portion 25 and which are supported against rotational forces by the usual heavy retaining rings 29. The conductors of the rotor winding are hollow, or have central passages extending through them, for flow of coolant liquid from one end of the winding to the other. Any suitable or desired type of flow pattern may be utilized and any desired type of electrical circuit may be used.

The rotor 20 shown in the drawing is a liquid cooled rotor of the construction more fully disclosed and claimed in a copending application of L. P. Curtis et al., Ser. No. 144,050, filed May 17, 1971, and assigned to the assignee of the present invention. The rotor 20 has shaft portions 30 extending axially from each end of the body portion 25 and preferably integral therewith, and has a central axial bore 31 which in accordance with usual practice may extend for the entire length of the rotor from one end to the other. An exciter 32 is provided for supplying field excitation to the winding 26. The exciter 32 may be of any desired type and has a shaft connected to the shaft 30 of the rotor to be driven therewith and which is, in effect, a part of the rotor shaft. As more fully described in the above-mentioned copending application, the coolant liquid which is preferably water is introduced through the shaft of the exciter 32 into the shaft portion 30 at the left end of the rotor, as seen in FIG. 1. For this purpose, the exciter shaft includes a central tube or pipe 33, preferably of stainless steel or other corrosion resistant material, which is coaxial with the rotor shaft and which extends outwardly from the exciter shaft, as shown in the drawing, for the introduction of water.

The water flows through the tube 33 along the axis of the exciter shaft and is directed into an annular passage 34 in the bore 31 of the rotor 20. The passage 34 is preferably formed by two concentric stainless steel tubes which surround axial electrical leads 35 which provide electrical connection from the exciter 32 to the rotor winding 26. The water flows through the passage 34 to opposed radial passages 36 which extend to an annular distribution chamber 37 on the surface of the rotor shaft 30. Water is distributed from the annular chamber 37 by means of hydraulic connectors 38 of any suitable type to the individual conductors of the rotor winding, the connections being made to the end turns 28. The water flows through the hollow conductors of the rotor winding to the other end and is discharged through similar hydraulic connectors 39 to an annular collecting chamber 40 on the shaft 30 at the right-hand end of the rotor. The water flows from the chamber 40 through two opposed radial passages 41 to the bore 31 of the shaft, and axially through the bore 31 to opposed radial passages 42 which extend to the surface of the rotor shaft 30.

All the passages and surfaces exposed to the liquid are preferably lined or covered with stainless steel or other corrosion resistant material to prevent corrosion of the rotor steel by the heated coolant water. In particular, the bore 31 at the right-hand end of the rotor is lined with a tubular stainless steel liner 43 extending between the two sets of radial passages 41 and 42, and the ends of the liner are closed by suitable plugs or partitions 44 to close this section of the bore 31 and confine the coolant liquid thereto.

The coolant water is thus introduced into the rotor through the rotating tube 33 which is on the axis of the exciter shaft, and is discharged from the rotor through the radial passages 42. As previously explained, it is necessary to provide very effective seals at these points to prevent escape of the coolant water which flows through the rotor in relatively large volume and at high velocity and pressure.

Figure 2:
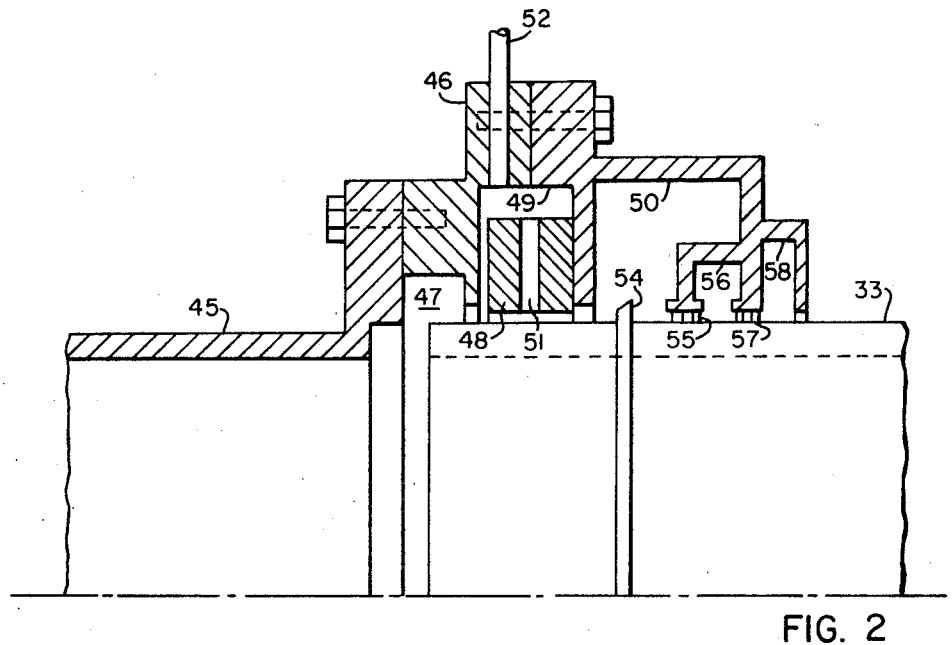
FIG. 2 is a partial longitudinal sectional view on a larger scale of the sealing means at the entrance passage of the rotor.

At the entrance end, as shown in detail in FIG. 2, water is supplied through a stationary pipe or conduit 45. The pipe 45 is connected to a stationary seal housing 46 which surrounds the end of the rotating entrance tube 33, and the pipe 45 is connected to the housing 46 in any suitable manner to form a leak-proof joint. The flanged end of the pipe 45 and the seal housing 46 form a coolant chamber 47 surrounding and enclosing the open end of the rotating entrance tube 33. The coolant water which has been suitably treated is supplied through the pipe 45 under the necessary pressure to maintain the required flow of liquid through the rotor and fills the chamber 47 from which it flows into the tube 33. The sealing means contained in the housing 46 prevents escape of water from the chamber 47 on the outside of the tube 33. The seal is of the radial gland seal type and includes a seal ring 48 contained in an annular chamber 49 surrounding the tube 33. The ring 48 encircles the tube 33 with a small radial clearance, which may be of the order of a few mils, and fits in the chamber 49 with as small a clearance as possible to minimize leakage past the ring in the radial direction. The seal ring 48 is stationary in the chamber 49 and may be held against rotation in any desired manner. Another annular chamber 50 surrounds the tube 33 adjacent the chamber 49 and is maintained at atmospheric pressure in any suitable manner.

It will be apparent that since the liquid in the coolant chamber 47 is at relatively high pressure, the pressure drop across the clearance between the ring 48 and the tube 33 is correspondingly high, and the leakage of coolant water through this clearance into the chamber 50 would be quite large. This is undesirable because the coolant water is treated to maintain a high level of purity and to remove dissolved oxygen and is recirculated after discharge from the rotor. The loss of a substantial amount of this liquid is therefore undesirable as it would require an increased capacity of treating and pumping equipment to supply the necessary large amounts of treated makeup water. In order to minimize the leakage of coolant or primary water through the seal ring clearance, the ring 48 has a plurality of radial openings 51 extending through it and a supply of untreated sealing or secondary water is provided through a pipe 52 into the chamber 49. The sealing liquid thus flows through the openings 51 into the clearance space between the ring 48 and the tube 33. If the pressure of the sealing liquid supplied through the pipe 52 could be kept exactly equal to the pressure in the coolant chamber 47, there would obviously be no leakage of coolant liquid and the sealing or secondary liquid would fill the clearance under the ring 48 and escape into the chamber 50. Since it is not possible, with actual pressure regulators, to continuously maintain the pressure of the sealing liquid exactly equal to that of the coolant liquid, suitable pressure regulating means are provided to maintain a small pressure difference such that the pressure of the secondary or sealing liquid is less than that of the coolant liquid by a small predetermined amount, such as 0.25 psi, for example, or in any event does not exceed the pressure of the coolant liquid. Thus, any leakage is of the coolant liquid into the sealing liquid, and the coolant liquid flowing into the tube 33 is not contaminated by untreated sealing liquid. Since the pressure of the sealing liquid is only slightly less than that of the coolant liquid, the amount of coolant liquid which can escape through the clearance under the seal ring 48 is extremely limited and total leakage is very effectively minimized.

The sealing liquid, with a small amount of coolant liquid, escapes through the seal ring clearance into the chamber 50, which is maintained at atmospheric pressure, and is drained from the chamber 50 through a drain pipe 53 (FIG. 1). A thrower 54 is preferably provided on the tube 33 within the chamber 50 to remove any water flowing on the tube. A labyrinth seal 55 is preferably provided between the outer wall of the chamber 50 and the tube 33 to seal the chamber 50. Since some water will tend to follow the shaft and get past the thrower 54, there is a tendency for some leakage through the labyrinth seal 55. In order to prevent this, another annular chamber 56 is provided on the outside of the chamber 50, with a seal 57 between the outer wall of the chamber 56 and the tube 33. The chamber 56 is maintained at an air pressure somewhat above atmospheric, in any suitable manner, and this pressurized chamber prevents leakage of water through the labyrinth seal 55. A final annular chamber 58 may encircle the shaft adjacent the chamber 56 to protect the seal 57 and to maintain the pressurization of the chamber 56.

Figure 3:
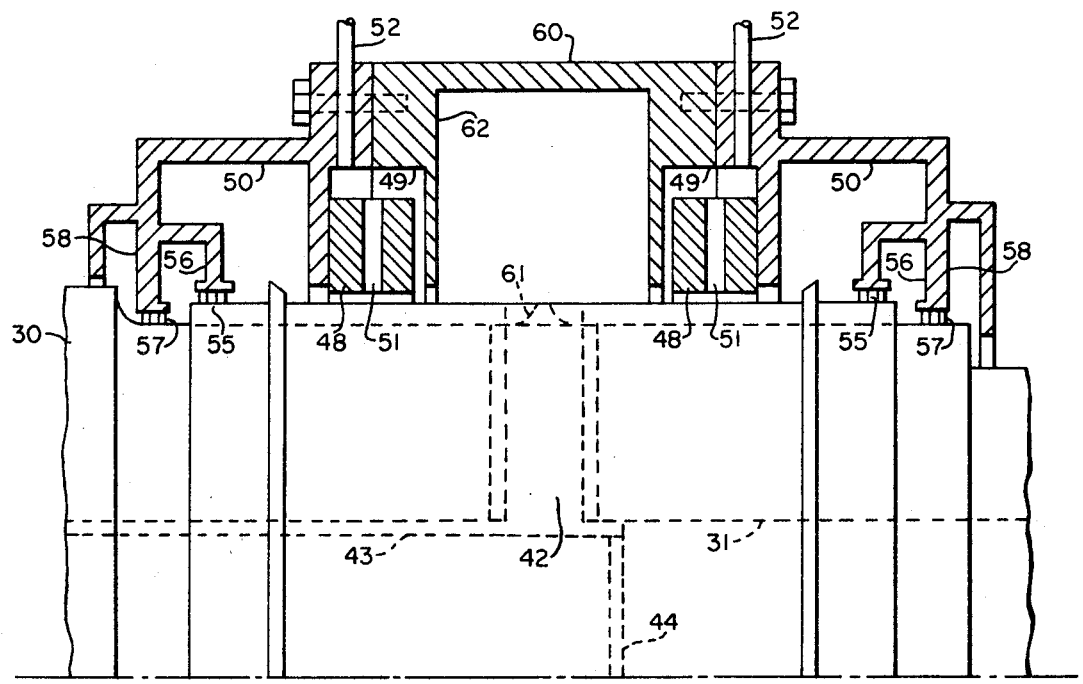
FIG. 3 is a similar view of the sealing means at the discharge passages of the rotor.

At the discharge end of the rotor, as shown in FIG. 3, the coolant water which has passed through the rotor is discharged through the opposed radial passages 42 into a stationary discharge housing 60 which encircles the shaft 30 and encloses the radial passages 42. As more fully described in another copending application of L. P. Curtis et al., Ser. No. 182,368, filed Sept. 21, 1971 and assigned to the assignee of this invention, each of the radial passages 42 preferably has a closure plug 61 at its outer end with a suitable restricting orifice therethrough to control the flow of water discharged from the rotor. The coolant water thus discharged flows into the stationary coolant chamber 62 which surrounds the shaft and the water in this chamber is drained therefrom through a suitable drain pipe 63 (FIG. 1). The coolant liquid discharged in this way is preferably cooled and treated as previously described, or otherwise, and recirculated to the entrance supply pipe 45, or it may be disposed of in any other desired manner.

The discharge and recirculation system for the coolant liquid may contain means, such as a throttle valve, for restricting the flow sufficiently to keep the chamber 62 filled with water in order to avoid cavitation. In some cases, however, such as where the surface velocity of the rotor shaft is very high, it may be preferable to keep the chamber 62 drained and avoid contact of the water with the shaft as far as possible. It will be obvious that the chamber 62 can be operated either filled with water or drained, by suitable control of the discharge flow. The pressure in the chamber 62 must of course be greater than atmospheric in order to permit the water to be discharged, but the pressure should preferably not be any higher than is necessary, so as to minimize leakage through the seals.

The chamber 62 is sealed on both sides by sealing means similar to the seal utilized at the entrance end and described above, and similar elements have been given the same reference numerals in FIG. 3. It will be seen that on each side of the chamber 62 there is provided a stationary seal ring 48 in an annular chamber 49. The secondary or sealing liquid is supplied through pipes 52 to the chambers 49 and escapes through the seal ring clearances to the chambers 50 at atmospheric pressure. The sealing liquid is supplied at a pressure not exceeding the pressure in the chamber 62, to prevent contamination of the coolant water as previously explained, and the sealing liquid with a small amount of coolant water leakage escapes from the chambers 50 through suitable drain pipes 64 (FIG. 1). The chambers 50 are sealed by labyrinth seals 55 and pressurized air chambers 56 are provided to prevent leakage through the seals 55. The sealing means on each side of the chamber 62 are thus essentially identical to the entrance sealing means shown in FIG. 2 and described above, and operate in exactly the same manner.

Sealing means have thus been provided which are very effective in containing, with minimum leakage, the large volume of high pressure coolant water circulated through the rotor of a large generator. In both entrance and discharge seals, the coolant is contained in a chamber encircling the rotating shaft or tube and is maintained at a relatively constant pressure in this chamber which is made as low as possible consistent with the requirements for circulation of the liquid. Gland seal rings encircle the shaft or tube adjacent the coolant chamber but such rings alone would not prevent excessive leakage because of the high pressure drop across the clearance between the rings and shaft. In order to minimize this leakage, a secondary or sealing liquid is introduced through the rings into the clearance around the shaft and kept at a pressure not exceeding the pressure in the coolant chamber. Thus, leakage of coolant liquid is minimized, and the sealing liquid is prevented from contaminating the coolant liquid in the chamber since any leakage will be outward from the coolant chamber into the sealing liquid. A relatively large volume of sealing water will be circulated in this way, but since this water does not have to be treated and can be directly recirculated from the drain pipes 53 or 64 to the supply pipes 52 it is not objectionable. A very effective seal is thus provided which substantially prevents escape of any significant amount of water at either entrance or discharge end of the rotor and thus very effectively minimizes the loss of treated coolant water.

A preferred embodiment of the invention has been shown and described for the purpose of illustration but it will be apparent that other modifications and embodiments of the invention are possible, and all such modifications are within the scope of the invention.

We claim as our invention:

1. In a dynamoelectric machine, a rotor member including shaft portions and having passages for circulation of a liquid coolant therethrough, said passages including entrance and discharge passages in the shaft portions for introducing coolant into the rotor and discharging it therefrom, sealing means associated with said entrance and discharge passages, each of said sealing means comprising a stationary coolant chamber surrounding the shaft and containing coolant at a predetermined pressure, said coolant chamber having a small clearance with the shaft, a stationary seal ring encircling the shaft with a small clearance adjacent said coolant chamber, means for introducing a sealing liquid into the clearance between said seal ring and the shaft, said sealing liquid being maintained at a pressure not exceeding the pressure of the coolant liquid, a stationary chamber surrounding the shaft adjacent the seal ring for receiving liquid flowing between the ring and the shaft, means for sealing said last-mentioned chamber, and means for draining liquid from the last-mentioned chamber.

2. The combination defined in claim 1 in which the last-mentioned chamber is maintained at atmospheric pressure and has labyrinth seal means between the chamber and the shaft.

3. The combination defined in claim 2 including another chamber surrounding the shaft adjacent the labyrinth seal means and containing air at greater than atmospheric pressure.

4. The combination defined in claim 1 in which said seal ring is contained in an annular chamber adjacent the coolant chamber and has radial openings therethrough, and means for applying sealing liquid to said annular chamber to flow through said openings to the clearance between the seal ring and the shaft.

5. In a dynamoelectric machine, a rotor member having passages for circulation of a liquid coolant therethrough, said rotor member having shaft portions at each end thereof, said passages including an entrance passage comprising an open tube extending coaxially from one of said shaft portions and rotatable therewith, said passages further including opposed radial discharge passages in one of said shaft portions communicating with an axial passage to discharge coolant therefrom, entrance seal means associated with said rotatable tube, discharge seal means associated with said discharge passages, each of said seal means including a stationary coolant chamber surrounding the rotor member with a small clearance and containing coolant under pressure, a stationary seal ring adjacent the coolant chamber and encircling the rotor member with a small clearance, means for introducing a sealing liquid into the clearance between the seal ring and rotor at a pressure not exceeding the pressure of coolant in the coolant chamber, and means for containing and draining off sealing liquid flowing between the seal ring and the rotor.

6. The combination defined in claim 5 in which each seal means includes an annular chamber adjacent the seal ring for receiving sealing liquid, said annular chamber being sealed and maintained at substantially atmospheric pressure, and means for draining sealing liquid from the annular chamber.

7. The combination defined in claim 5 in which said entrance seal means comprises a stationary coolant chamber enclosing the open end of said rotatable tube and containing coolant under pressure, a stationary annular chamber adjacent said coolant chamber containing said seal ring, means for introducing sealing liquid through said annular chamber to the seal ring at a pressure not exceeding the pressure of the coolant, a second annular chamber adjacent the seal ring for receiving sealing liquid, said second annular chamber being maintained at a pressure below the pressure of the sealing liquid, means for sealing the second annular chamber, and means for draining sealing liquid therefrom.

8. The combination defined in claim 7 including a labyrinth seal between the second annular chamber and the rotor, and another chamber adjacent the labyrinth seal containing air at a higher pressure than the pressure in the second annular chamber.

9. The combination defined in claim 5 in which said discharge seal means comprises a stationary coolant chamber enclosing said discharge passages, said coolant chamber containing coolant under pressure discharged from said passages and having means for draining coolant therefrom, a stationary seal ring encircling the shaft on each side of the coolant chamber, stationary annular chambers adjacent the coolant chamber on each side thereof and containing the seal rings, means for introducing sealing liquid through said annular chambers to the seal rings at a pressure not exceeding the pressure in the coolant chamber, other annular chambers surrounding the shaft adjacent each of said seal rings for receiving sealing liquid, each of said other chambers being maintained at a pressure below the pressure of the sealing liquid, means for sealing said other chambers, and means for draining sealing liquid therefrom.

10. The combination defined in claim 9 including a labyrinth seal between each of said other chambers and the shaft, and a chamber adjacent each labyrinth seal containing air at a higher pressure than the pressure in said other chambers.

11. A shaft seal for preventing escape of liquid along a rotating shaft, said seal comprising a stationary chamber through which the shaft passes, said chamber containing liquid under pressure, a stationary seal ring encircling the shaft with a small clearance adjacent said chamber, means for introducing a flow of sealing liquid through said clearance between the seal ring and the shaft, the pressure of the sealing liquid not exceeding the pressure of the liquid in said chamber, a stationary annular chamber surrounding the shaft adjacent the seal ring for receiving said sealing liquid, said annular chamber being maintained at a pressure below the pressure of the sealing liquid, means for sealing the annular chamber, and means for draining liquid therefrom.

12. A shaft seal as defined in claim 11 in which the means for sealing the annular chamber includes a labyrinth seal between the chamber and the shaft and another chamber encircling the shaft adjacent the labyrinth seal and containing air at a pressure higher than the pressure in the annular chamber.

* * * * *